Feb. 26, 1963  M. V. BRAINE  3,078,832
ENGINES
Filed July 1, 1960  2 Sheets-Sheet 1

INVENTOR
Michael V. Braine
BY
ATTORNEY

United States Patent Office 3,078,832
Patented Feb. 26, 1963

3,078,832
ENGINES
Michael V. Braine, 6667 Zumirez Drive, Malibu, Calif.
Filed July 1, 1960, Ser. No. 40,214
8 Claims. (Cl. 123—41.65)

This invention relates to engines and more particularly to two cycle engines.

An object of this invention is to provide a new and improved engine.

Another object is to provide a new and improved internal combustion engine which is simple in design and economical of fabrication.

Still another object is to provide an internal combustion engine of the two cycle type having oppositely moving pistons disposed in tubular members or cylinders which extend between end frames mounted on the main shaft of the engine and having gear means for connecting the main shaft to the pistons whereby reciprocation of the pistons in the cylinders imparts rotation to the main shaft.

A further object is to provide an engine wherein the thrust forces of oppositely moving pistons are imparted in opposite directions to the main shaft whereby the housing of the engine is not required to absorb any of the thrust forces of the pistons and consequently may be economical in construction and light in weight.

A still further object is to provide an internal combustion engine having a main shaft on which a cylinder assembly is mounted and which is provided with a gear means connecting the pistons of the cylinders to a pair of crown gears mounted on opposite ends of the shaft, the crown gears and the cylinder assembly being placed under compression by stress means provided on such shaft whereby oppositely acting thrust forces of the pistons in the cylinders are counterbalanced in the main shaft.

Additional objects and advantages of the invention will be readily apparent from the reading of the following description of a device constructed in accordance with the invention, and reference to the accompanying drawings thereof, wherein.

Figure 1:
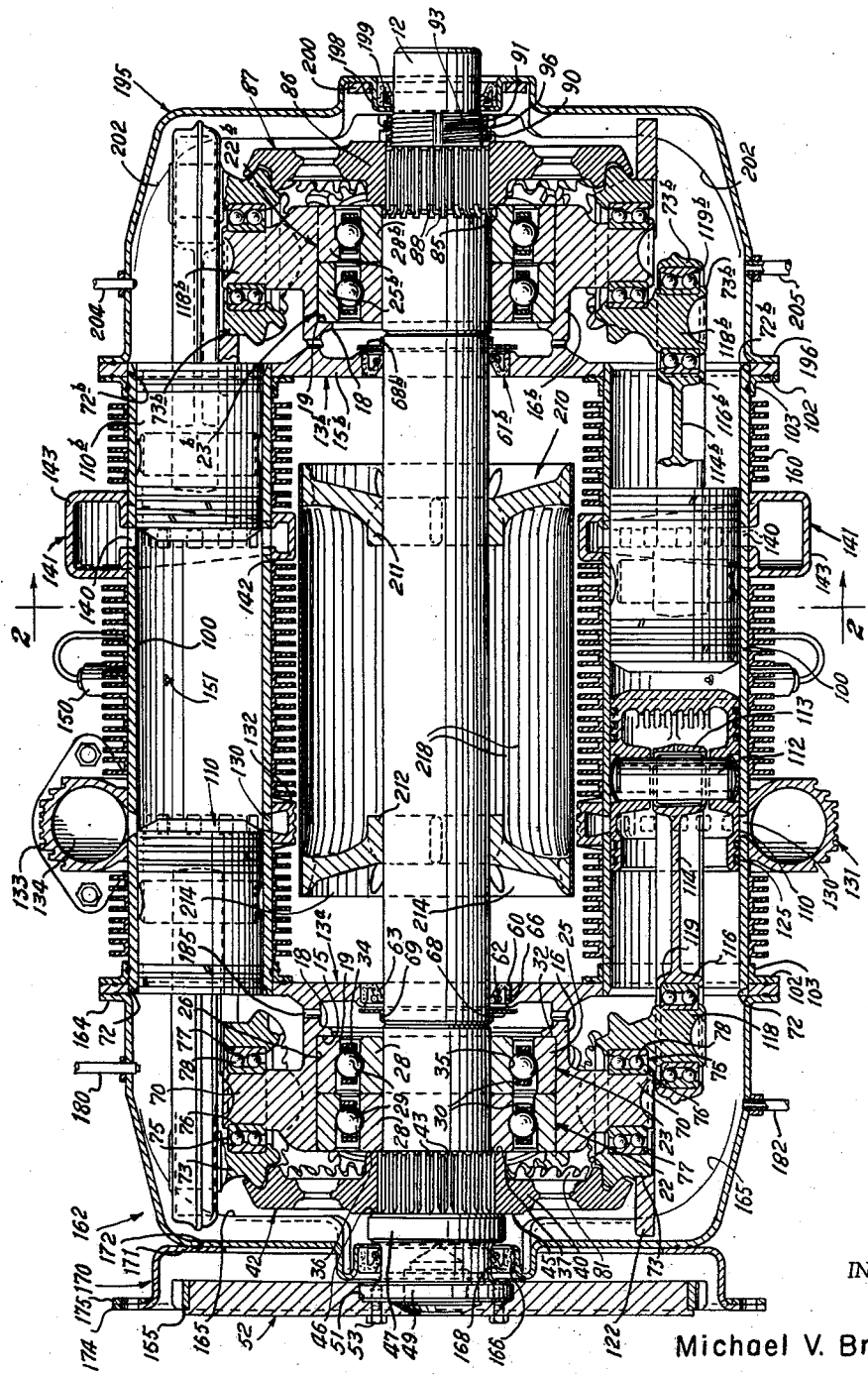
FIGURE 1 is a sectional view of an engine embodying the invention.

Referring now to the drawing, the two cycle internal combustion engine 10, which may be of the diesel type, includes a main shaft 12 and a pair of end frames 13 identical in construction in which the main shaft is rotatably mounted. Each of the end frames includes a disc plate 15 having an outwardly extending hub 16. The hub has an internal annular flange 18 spaced outwardly of the disc plate which provides an annular outwardly facing shoulder 19. A pair of roller bearing assemblies 22 and 23 are mounted in the hub.

Each of the roller bearing assemblies includes an outer race 25 whose outer peripheral surface abuts the inner cylindrical surface 26 of the hub, an inner race 28 whose inner cylindrical surface engages the outer surface of the shaft, and ball bearings 29 interposed between the inner and outer spaces and held in operative position by a cage 30. The inner annular edge surface 32 of the outer race 25 of the ball bearing assembly 23 abuts the annular shoulder 19 provided by the internal annular flange 18 of the hub whereby the movement of the ball bearing assemblies inwardly relative to the hub and therefore to the end frame is limited.

It will be apparent that the adjacent end surfaces of the races of the ball bearing assemblies 22 and 23 abut one another whereby any thrust imparted to the outer race of the inner bearing assembly 23 is also imparted to the inner race of the outer ball bearing assembly 22.

It will further be noted that the ball bearings 29 abut outwardly facing arcuate shoulders 34 of the outer races and are rotatably disposed in arcuate recesses 35 in the outer surfaces of the inner races of the ball bearing assemblies whereby any outward thrust imparted to the outer race 25 of the inner ball bearing assembly 23 is transmitted by means of the ball bearing 29 to the inner races.

The outer annular surface 36 of the inner race 28 of the outer ball bearing assembly 22 engages the annular shoulder 37 of a hub 40 of a crown gear 42 non-rotatably mounted on the main shaft 12 due to the engagement of the radially outwardly extending splines 43 of the shaft in radial longitudinal recesses of corresponding configuration provided in the internal surface of the hub of the crown gear. Outward movement of the crown gear is limited by the engagement of its outer annular surface 45 with the inner shoulder 46 of an external flange 47 of the shaft. Thus it may be seen that any thrust or force applied to the end frame 13a is transmitted by means of the internal flange 18 thereof through the ball bearing assemblies to the hub of the crown gear and thence to the annular shoulder 46 of the main shaft.

The shaft also has an outer anular end flange 49 which is receivable in an annular recess 51 of a fly wheel 52, the fly wheel being rigidly securable to the end flange 49 by any suitable means, such as the bolts 53 which extend through suitable apertures of the fly wheel into threaded bores in the end flange 49.

The main shaft extends through an aperture 60 of the disc plate 15 and a flexible seal 61 is disposed in the aperture 60 to seal between the disc plate 15 and the main shaft. The seal 61 may be of any suitable type, for example substantially V-shaped, and may have a garter spring 62 engaging the inner flange 63 thereof to yieldingly hold the flange 63 in sealing engagement with the cylindrical surface of the shaft. The other annular flange 66 of the seal 61 abuts the cylindrical surface defining the aperture 60 and may be secured thereto in any suitable manner, as by a suitable adhesive or bonding agent.

A protective annular plate 68 may extend radially outwardly from the shaft outwardly of the seal 61 to limit the flow of lubricant to the seal. The protective annular plate 68 may be secured to the shaft in any suitable manner by means of its annular flange 69 which may be welded to the shaft.

The hub 16 is provided with a plurality of radially outwardly extending stub shafts 70 which are aligned with a plurality of apertures 72 in the disc plate 15. A gear 73 is rotatably mounted on each stub shaft by means of any suitable ball bearing assembly 75, which may have an inner race 76 mounted on the stub shaft, an outer race 77 disposed in the central annular aperture of the gear and ball bearings 78 interposed between the races. The teeth of the gears 73 mesh with the teeth 81 of the crown gear which is rigid with the main shaft 12 whereby rotation of the gears 73 causes rotation of the crown gear 42 and therefore of the main shaft 12.

The end frame 13b is similar in all respects to the end frame 13a and elements of the end frame 13b have been provided with reference characters, to which the subscript b has been added, of the corresponding elements of the end frame 13a. The main shaft 12 is provided outwardly of the seal 61b with a protector plate 68b which functions in the same manner as the protector plate 68. The inner race 28b of the outer bearing assembly 22b abuts the annular inner shoulder or surface 85 of the hub 86 of a crown gear 87 non-rotatably mounted on the main shaft 12 by means of the splines 88 of the shaft received in longitudinally extending grooves of corresponding configuration in the hub 86. The crown gears 42 and 87 are held against outward movement in opposite directions on the main shaft by a pair of lock nuts 90 and 91 threaded on the reduced portion 93 of the main shaft 12. Any suitable lock means 96 may be interposed between the two lock nuts to prevent their rotation relative to each other.

The two end frames are connected by a plurality of piston cylinders 100 whose opposite ends extend into aligned pairs of apertures 72 and 72b of the end frames 13b. The cylinders are secured to the end frames 13a and 13b by means of the connector rings 102 which are secured to the abutting surfaces of the disc plates in any suitable manner, as by brazing or welding, and whose annular flanges 103 are similarly secured to the cylinders.

It will now be apparent that due to the provision of the shaft with the flange 47 at one end of the shaft and the provision of the lock nuts 90 and 91 on the other end thereof, the main shaft 12 may be preloaded or prestressed since the engagement of the shoulders 37 and 85 of the hubs of the crown gears 42 and 87, respectively, with the internal races 28 and 28b of the bearing assemblies 22 and 22b and the engagement of the inner surfaces or shoulders of the outer races 25 and 25b of the bearing assemblies 23 and 23b, respectively, places the main shaft 12 under tension therebetween so that any outwardly and equal oppositely acting outwardly directed forces exerted on the stub shafts 70 and 70b of the end frames 13a and 13b, respectively, will be transmitted to and counterbalanced in the main shaft 12.

A pair of pistons 110 and 110b are slidably disposed in each piston cylinder 100. Each of the pistons may be hollow and provided with a transverse pin 112 extending through the hub 113 on one end of a piston rod 114. The opposite end of the piston rod is provided with the hub 116 which is rotatably mounted on the outwardly mounted eccentrically disposed shaft 118 of a gear 73 by means of a bearing assembly 119. The bearing assemblies 119 are identical in construction with the bearing assemblies 75 of the hub shafts 70 and will therefore not be described in further detail. The gears 73 are provided with balances or weights 122 to counterbalance the weight of the shaft 118.

The pistons 110 of course have the usual piston rings 125 which seal between the pistons and the internal wall surfaces of the piston cylinders. The pistons 110b are identical in construction to the pistons 110 and have been provided with the same reference numerals, to which the letter b has been added, as corresponding elements of the pistons 110.

Each of the piston cylinders has a plurality of circumferentially arranged and spaced exhaust ports 130 which open outwardly to an exhaust manifold 131. The exhaust manifold has branches 132 which encircle each cylinder and which communicate with a circular main section 133 of the manifold. The exhaust manifold is provided with an outlet 134 through which the exhaust gases may flow outwardly to the atmosphere either directly or through any suitable muffler. The manifold and its branches 132 may be secured to the piston cylinders in any suitable manner, as by welding or brazing.

Each of the piston cylinders is also provided with a plurality of air inlet ports 140, longitudinally spaced from the exhaust ports, which open to air manifold 141 which is similar in construction to the exhaust gas manifold having substantially annular branches 142 which encircle each cylinder and an annular main section 143 which encircles the piston cylinders. The air manifold 141 has a suitable inlet 144 through which air under pressure may be introduced into the air manifold and thence through the inlet ports into the cylinders when the pistons are in the extreme outward positions as shown by the upper pistons in FIGURES 1 and 2. In this event the air under pressure may flow in from the air manifold and its branches through the inlet ports 140 of the cylinders to force exhaust gases through the exhaust ports 130 into the branches 132 and to the exhaust manifold.

Figure 2:
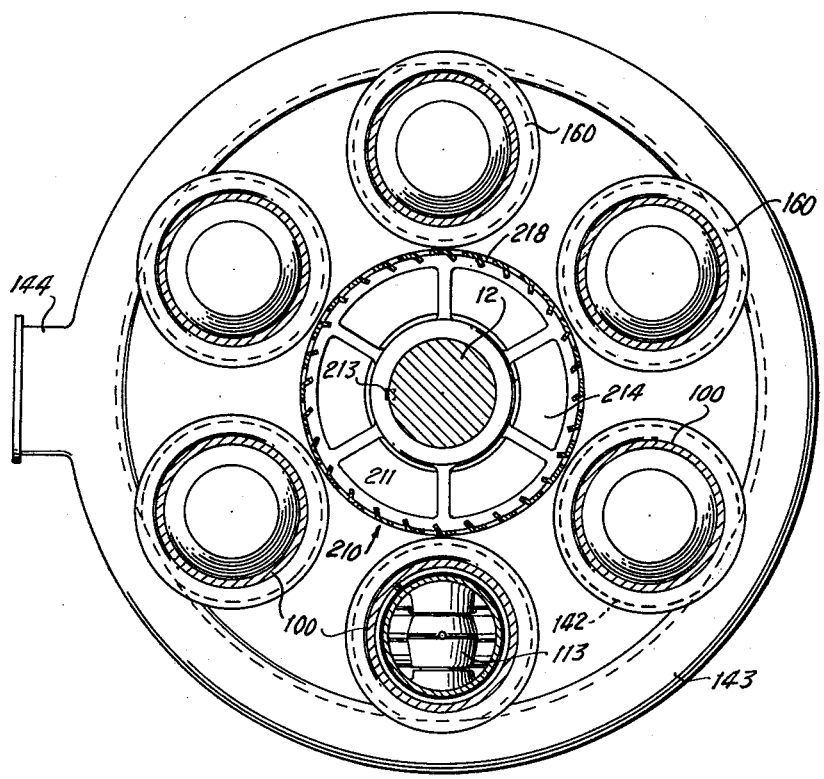
FIGURE 2 is a sectional view taken on line 2—2 of FIGURE 1.
Figure 3:
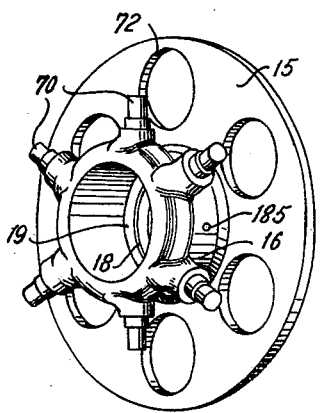
FIGURE 3 is a perspective view of one of the end frames of the engines.

A combustible fuel, such as oil, is introduced into each cylinder at appropriate times in the cycle of operation by means of the usual injector means 150 which have a spray nozzle 151 opening into each cylinder at approximately the mid-point thereof so that the fuel is injected into each cylinder when the pistons have moved to positions adjacent to but spaced from each other, as illustrated by the lower two pistons in FIGURE 1. The space between the pistons contains a charge of air whereby the introduction of the fuel into the cylinder between the pistons results in the immediate combustion of the fuel due to the fact that the compressed air is at a temperature sufficiently high to cause ignition of the fuel. The injection of the fuel into each cylinder must of course be at an appropriate time in the cycle of operation of the pistons and for this reason the fly wheel 52 is provided with a gear 155 which may be connected in any suitable manner to the usual starter, and to the injection system of the engine which causes each injector means 150 to inject fuel into its associated cylinder. When the two pistons therein have moved to their innermost positions in the cylinder, the injection of the fuel thereinto causes them to move simultaneously outwardly in opposite directions to cause the gears 73 and 73b to be rotated simultaneously and thus cause rotation of the main shaft 12.

The pistons 110 and 110b of the various cylinders are so arranged so that the injection of fuel into the cylinders is effected in a definite sequence as in the usual two cycle Diesel engine.

Each of the cylinders is provided with a plurality of metallic cooling vanes 160 which extend radially outwardly from the cylinder to conduct heat therefrom.

An end bell 162 is connected to the disc plate 15 of the end frame 13a by means of its radially outwardly extending annular flange 164 which engages the outer surface of an outer annular portion of the disc plate and is rigidly secured thereto in any suitable manner, as by welding or brazing. The end bell 162 extends around the hub of the end frame and its associated gears and may have inwardly extending strengthening ribs 165. The end bell is provided with an annular flange 166 through which the main shaft extends. An annular seal 168 is interposed between the flange and the main shaft, between the flanges 47 and 49 thereof, to seal therebetween. The seal 168 may be of any suitable type.

The engine and the end bell 162 may be secured to any supporting structure on which the engine is to be mounted by means of an attaching bracket 170 whose inwardly extending flange 171 abuts the annular end portion 172 of the end bell 162 and is rigidly secured thereto by any suitable manner, as by welding or brazing. The attaching bracket is also provided with an external annular flange 174 having a reinforcing ring 175 rigidly secured thereto, as by welding. The outer flange and the reinforcing ring have aligned apertures through which bolts or other means may extend to secure the attaching bracket to the supporting structure.

The end bell may be provided with an inlet 180 through which lubricating fluids such as oil, may be injected or sprayed into the end bell and with an outlet means duct 182 through which the lubricating fluid is withdrawn for recirculation. It will be apparent that the lubricating oil is sprayed over the gears and over the various bearing assemblies. The lubricating oil also splashes or is directed into the piston cylinders behind and into the pistons themselves since the hollow pistons open outwardly into the end bell. The hub 16 is provided with ports 185 througfih which the lubricating oil may flow to the inner ball bearing assembly 23 and the disc plate as well as to the seal 61. It will be noted that the fluid pressure within the crankcase between the flanges 63 and 66 of the seal tends to expand the seal into tighter engagement with the shaft and with the disc plate. The seal 163 is of similar construction and similarly seals between the shaft and end bell.

An end bell 195 is connected to the disc plate 15b of the end frame 13b by an outwardly extending annular flange 196 which abuts the outer surface of the outer portions of the disc plate 15b and is rigidly secured thereto in any suitable manner, as by welding or brazing. The end bell is provided at its inner edge with a flange 198 so that a seal 199 may be positioned therein to engage the shaft outwardly of the lock nuts 190 and 191 and seal between the end bell and the main shaft. A reinforcing ring 200 may be rigidly secured to the end bell about the flange 198 in any suitable manner, as by welding. The end bell 195 also is provided with inwardly extending reinforcing ribs 202. The end bell 195 may have a lubricating oil injecting means 204 and an outlet conduit 205 whereby lubricating fluid, such as oil, may be caused to circulate through the end bell and over the moving parts of the gears, and ball bearing assemblies and the pistons.

A squirrel cage blower 210 is rigidly mounted on the main shaft 12 and has hubs 211 and 212 non-rotatably secured to the shaft by means of the tongues 213 which are disposed in aligned recesses or grooves in the hubs and in the main shaft. The hubs of the squirrel cage blower are provided with inlet ports 214 whereby, when the blower is rotating, air is pulled inwardly between the cylinders adjacent the end frames and through the inlet ports into the interior of the squirrel cage blower and is then forced outwardly through the longitudinal apertures or slots 218 thereof and between and outwardly between the piston cylinders. This circulation of the air causes air to move over the cooling vanes of the piston cylinders and thus provides for proper cooling of the piston cylinders.

In use, either end of the shaft 12 of the engine may be connected to a load. The support bracket 170 is attached by bolts or other suitable connecting means which extend through the apertures in the reinforcing ring 175 and the outer external flange 174 of the bracket, to a supporting structure. The operation of the engine is initiated in the usual manner through an auxiliary starting device or by means of starting spark plugs which provide the means for igniting the mixture of fuel and air compressed between the pairs of pistons in the cylinders. Once the diesel engine is operating, the air compressed between the pistons is so hot that the fuel will ignite immediately upon being injected through the spray nozzles 151 into the cylinders. The pistons of the different cylinders operate sequentially so that when one pair of pistons in one cylinder are approaching one another, another pair of pistons in another cylinder are moving away from each other so that the thrusts imparted by the pistons of the different cylinders to the main shaft occur in properly timed sequence to maintain rotation of the main shaft and so that power is applied to the main shaft at all times.

When the fuel is injected between the pair of pistons which have moved inwardly to the extreme inward positions, as shown by the lower pistons in FIGURE 1, the fuel is injected into the cylinder between the pistons and its ignition creates a force which moves the pistons outwardly. When the pistons 110 and 110b move outwardly, they impart rotational movement to the gears 73 and 73b respectively by means of the piston rods 114 and 114b. If the gear 73 connected to the piston 110 of a cylinder rotates in one direction, say counterclockwise, then the gear 73b connected to the piston 110b of the same cylinder is caused to rotate in the opposite clockwise direction. As a result, the rotation of the gears 73 and 73b causes the crown gears 42 and 87 to rotate simultaneously in the same direction, and since the crown gears are rigid with the main shaft, the main shaft is also caused to rotate.

When the pistons 110 and 110b move outwardly of the exhaust and inlet ports 130 and 140 to the positions shown by the upper pistons shown in FIGURE 1, air under pressure flows inwardly from the inlet manifold through the inlet ports 140 to exhaust or scavenge the products of combustion or exhaust gases from the cylinder and to replace them with fresh oxygen bearing air, the exhaust gases flowing outwardly through the exhaust ports 130 into the exhaust manifold and thence to the atmosphere. When the exhaust gases have been scavenged, continued rotation of the main shaft causes the pistons 110 and 110b to move from their extreme outward positions inwardly to their extreme inward positions compressing the oxygen bearing air therebetween until they again assume their extreme inward positions. At this time a charge of fuel is again sprayed into the cylinder whereupon the combustion of the fuel again imparts outward forces to the pistons.

The outward thrusts or forces imparted to the stub shafts 70 and 70b of the end frames 13a and 13b upon the ignition of the fuel in each cylinder act in opposite outward longitudinal directions relative to the main shaft and such thrusts are transmitted through the internal flanges 18 and 18b of the hubs, of the end frames, the ball bearing assemblies and the hubs of the crown gears to the thrust flanges 47 and the lock nuts 90 and 91 of the shaft whereby the shaft absorbs such thrusts or forces which thus counterbalance each other in the shaft since the thrust acting on the thrust flange 47 due to the movement of one piston of a given cylinder is always opposite to the thrust imparted to the other end of the shaft by the piston of such cylinder through the lock nuts 90 and 91. Since the thrust forces of the oppositely moving pistons are absorbed and counterbalanced in the preloaded or prestressed shaft, the support bracket and the end bells may be made of light material since they do not need to absorb such thrusts or forces thus resulting in economy of construction and maintenance of the engine and also permitting light-weight construction thereof.

It will now be seen that the engine is simple in design being formed of a pair of end frames in which the main shaft is rotatably mounted and which support the piston cylinders.

It will further be seen that the oppositely moving pistons of each cylinder are connected by suitable gear means mounted on the end frames and on the main shaft to the main shaft to impart rotary movement to the main shaft whenever the pistons are moved outwardly in opposite directions in the piston cylinders.

It will further be seen that the shaft is pre-stressed by means of the thrust flange 47 and the lock nuts 90 and 91 to cause the crown gears of the shaft and the end frames to be urged toward each other whereby the simultaneously produced and oppositely acting thrust forces of the outwardly and oppositely moving pairs of pistons of the cylinders, which are not converted to rotary movement of the gears 73 and 73b, are transmitted to opposite ends of the shaft to act thereon in opposite directions whereby they are counterbalanced in the shaft and need not be absorbed by the mounting means of the engine.

It will further be noted that these thrust forces are counterbalanced since the equal forces at all times act on the pistons of each cylinder.

It is believed obvious that, if desired, a suitable driving gear (not shown) may be mounted on either end of the shaft 12 for the purpose of driving a fuel injection pump, a governor, a supercharger assembly, an auxiliary generator for battery charging, or an air compressor or other similar device for brake control in case the engine is used for road transport or similar purposes. In such event, the gear might be connected by means of the bolts 53 to the fly wheel 52 or by suitable means to the opposite end of the shaft 12.

It will further be seen that while the engine embodying the invention has been described in connection with its operation as a Diesel engine wherein ignition of the fuel occurs due to the elevated temperature present in the cylinder, it may operate as an internal combustion engine wherein the mixture is ignited by a spark produced by a spark plug.

It will further be seen that the engine could also be caused to operate as a steam engine if steam under pressure were introduced into each cylinder whenever the pistons thereof moved to their innermost positions in each cylinder.

It will further be seen that the provision of an engine having spaced piston cylinders arranged circumferentially about the shaft permits the use of a squirrel cage blower for moving cooling air past the cylinders to maintain the temperature of the engine at a desired value.

It will further be seen that a new and improved engine has been illustrated and described which is formed of a minimum number of parts which are easily and quickly assemblied.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. An engine including: a pair of spaced end frames having aligned main shaft apertures and a plurality of peripherally spaced aligned cylinder apertures; a main shaft extending through said main shaft aperture; a plurality of piston cylinders secured between said end frames and opening through said cylinder apertures outwardly of said end frames; a pair of oppositely moving pistons in each cylinder; gears mounted on said end frames, said pistons being connected to said gears on said end frames; gears on opposite ends of said main shaft in meshing relation with said gears mounted on said end frames; and means on said main shaft for exerting a force urging said end frames toward one another whereby oppositely acting thrust forces of the pairs of pistons in the cylinders are counterbalanced in the main shaft.

2. An engine including: a pair of spaced end frames having aligned main shaft apertures and a plurality of peripherally spaced aligned cylinder apertures; a main shaft extending through said main shaft aperture; a plurality of piston cylinders secured between said end frames and opening through said cylinder apertures outwardly of said end frames; a pair of oppositely moving pistons in each cylinder, said end frames having radially outwardly extending shafts; gears mounted on said shafts; means connecting said gears to said pistons whereby reciprocatory movement of said pistons in said cylinders imparts rotational movement to said gears on said end frame shafts; gear means longitudinally spaced on said main shaft in meshing relation with said gears of said shafts of said end frames; and means on said shaft for prestressing said gear means and said end frames toward one another whereby oppositely acting thrust forces of each pair of pistons in a cylinder are counterbalanced in the main shaft.

3. An engine including: a pair of spaced end frames having aligned main shaft apertures and a plurality of peripherally spaced aligned cylinder apertures; a main shaft extending through said main shaft aperture; a plurality of peripherally spaced piston cylinders secured between said end frames and opening through said cylinder apertures outwardly of said end frames; a pair of oppositely moving pistons in each cylinder; gears mounted on said end frames, said pistons being connected to said gears on said end frames; gears on opposite ends of said main shaft in meshing relation with said gears mounted on said end frames; means on said main shaft for exerting a force urging said end frames toward one another whereby oppositely acting thrust forces of the pairs of pistons in the cylinders are counterbalanced in the main shaft; and blower means rigidly mounted on said shaft between said end frames for circulating air about and between said piston cylinders.

4. An engine including: a pair of spaced end frames having aligned main shaft apertures and a plurality of peripherally spaced aligned cylinder apertures; a main shaft extending through said main shaft apertures; a plurality of peripherally spaced piston cylinders secured between said end frames and opening through said cylinder apertures outwardly of said end frames; a pair of oppositely moving pistons in each cylinder, said end frames having radially outwardly extending shafts; gears mounted on said shafts; means connecting said gears to said pistons whereby reciprocatory movement of said pistons in said cylinders imparts rotational movement to said gears on said end frame shafts; gear means longitudinally spaced on said main shaft in meshing relation with said gears of said shafts of said end frames; blower means rigidly mounted on said shaft between said end frames and radially inwardly of said piston for circulating air about and between said piston cylinders; and means on said shaft for prestressing said gear means and said end frames toward one another whereby oppositely acting thrust forces of each pair of pistons in a cylinder are counterbalanced in the main shaft, said piston cylinders being provided with heat exchanger means disposed in the path of flow of air circulated by said blower means.

5. An engine including; a pair of spaced end frames having aligned main shaft apertures and a plurality of peripherally spaced aligned cylinder apertures; a main shaft extending through said main shaft apertures; a plurality of peripherally spaced piston cylinders secured between said end frames and opening through said cylinder apertures outwardly of said end frames; a pair of oppositely moving pistons in each cylinder, said end frames having radially outwardly extending shafts; gears mounted on said shafts; means connecting said gears to said pistons whereby reciprocatory movement of said pistons in said cylinders imparts rotational movement to said gears on said end frame shafts; gear means longitudinally spaced on said main shaft in meshing relation with said gears of said shafts of said end frames; blower means rigidly mounted on said shaft between said end frames and radially inwardly of said piston cylinders for circulating air about and between said piston cylinders; means on said shaft for prestressing said gear means and said end frames toward one another whereby oppositely acting thrust forces of each pair of pistons in a cylinder are counterbalanced in the main shaft, said piston cylinders being provided with heat exchanger means disposed in the path of flow of air circulated by said blower means; and friction reducing bearing means interposed between said shaft and said end frames and between said end frames and said main shaft, said bearing means, said end frames and said main shaft having coengageable means for transferring outwardly directed thrust forces exerted on the end frames to the main shaft.

6. An engine including: a pair of spaced end frames having aligned main shaft apertures and a plurality of peripherally spaced aligned cylinder apertures; a main shaft extending through said main shaft apertures; a plurality of piston cylinders secured between said end frames and opening through said cylinder apertures outwardly of said end frames; a pair of oppositely moving pistons in each cylinder; gears mounted on said end frames; said pistons being connected to said gear on said end frames; gears on opposite ends of said main shaft in meshing relation with said gears mounted on said end frames; means on said main shaft for exerting a force urging said end frames toward one another whereby oppositely acting thrust forces of the pairs of pistons in the cylinders are counterbalanced in the main shaft; friction reducing bearing means interposed between said shaft and said end frames and between said end frames and said main shaft, said bearing means, said end frames and said main shaft having coengageable means for transferring outwardly directed thrust forces exerted on the end frames to the main shaft.

7. An engine including: a pair of spaced end frames having aligned main shaft apertures and a plurality of peripherally spaced aligned cylinder apertures; a main shaft extending through said main shaft apertures; a plurality of piston cylinders secured between said end frames and opening through said cylinder apertures outwardly of said end frames; a pair of oppositely moving pistons in each cylinder, said end frames having radially outwardly extending shafts; gears mounted on said shafts; means connecting said gears to said pistons whereby reciprocatory movement of said pistons in said cylinders imparts rotational movement to said gears on said end frame shafts; gear means longitudinally spaced on said main shaft in meshing relation with said gears of said shafts of said end frames; and means on said shaft for pre-stressing said gear means and said end frames toward one another whereby oppositely acting thrust forces of each pair of pistons in a cylinder are counterbalanced in the main shaft.

8. An engine including: a pair of spaced end frames having aligned main shaft apertures and a plurality of peripherally spaced aligned cylinder apertures; a main shaft extending through said main shaft apertures; a plurality of piston cylinders secured between said end frames and opening through said cylinder apertures outwardly of said end frames; a pair of oppositely moving pistons in each cylinder, said end frames having radially outwardly extending shafts; gears mounted on said shafts; means connecting said gears to said pistons whereby reciprocatory movement of said pistons in said cylinders imparts rotational movement to said gears on said end frame shafts; gear means longitudinally spaced on said main shaft in meshing relation with said gears of said shafts of said end frames; means on said shaft for pre-stressing said gear means and said end frames toward one another whereby oppositely acting thrust forces of each pair of pistons in a cylinder are counterbalanced in the main shaft; and means connected to said end frames and extending outward in opposite directions to enclose said gears and said gear means.

References Cited in the file of this patent

UNITED STATES PATENTS

| | | |
|---|---|---|
| 1,324,520 | Robbins | Dec. 9, 1919 |
| 1,869,440 | Schlenker | Aug. 2, 1932 |
| 1,987,194 | Gray | Oct. 23, 1934 |
| 2,099,983 | Lake | Nov. 23, 1937 |

FOREIGN PATENTS

| | | |
|---|---|---|
| 290,048 | Italy | Nov. 6, 1931 |